United States Patent [19]
Bredenkamp

[11] Patent Number: 4,486,038
[45] Date of Patent: Dec. 4, 1984

[54] ENERGY STORAGE

[75] Inventor: Gordon L. Bredenkamp, Roodepoort, South Africa

[73] Assignee: Crucible Society Anonyme, Luxembourg, Luxembourg

[21] Appl. No.: 409,658

[22] Filed: Aug. 19, 1982

[51] Int. Cl.³ .............................................. F16C 32/04
[52] U.S. Cl. ....................................... 290/1 R; 308/10
[58] Field of Search ........................... 290/1 R; 308/10

[56] References Cited
U.S. PATENT DOCUMENTS

| | | | |
|---|---|---|---|
| 3,877,761 | 4/1975 | Boden et al. | 308/10 |
| 4,211,452 | 7/1980 | Poubeau | 308/10 |
| 4,285,553 | 8/1981 | Robinson | 308/10 |

Primary Examiner—J. V. Truhe
Assistant Examiner—Shelley Wade
Attorney, Agent, or Firm—Stanley J. Price, Jr.; John M. Adams

[57] ABSTRACT

Energy is stored in a hoop 12 spinning around a stator 10 both made of soft steel. At the interface between them there is a cavity in which there are conductors to provide a magnetic bearing between the hoop and the stator. A magnetic levitation device keep the hoop levitated. Energy is imparted to and withdrawn from the hoop by means of linear reluctance motors.

8 Claims, 5 Drawing Figures

U.S. Patent   Dec. 4, 1984   Sheet 1 of 2   4,486,038
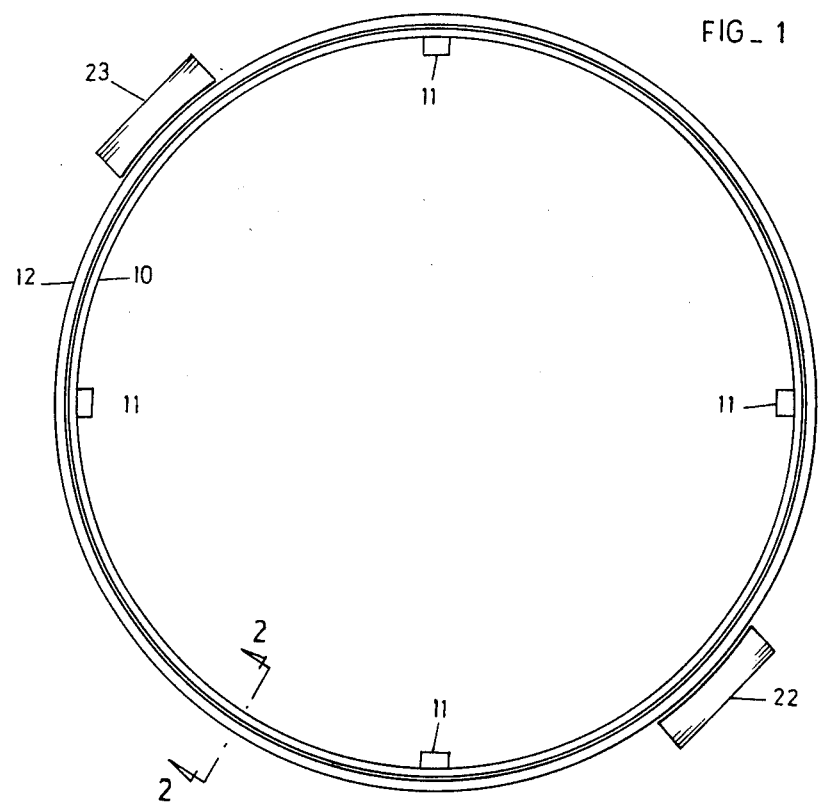
FIG_1
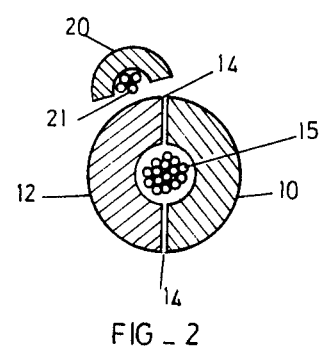
FIG_2

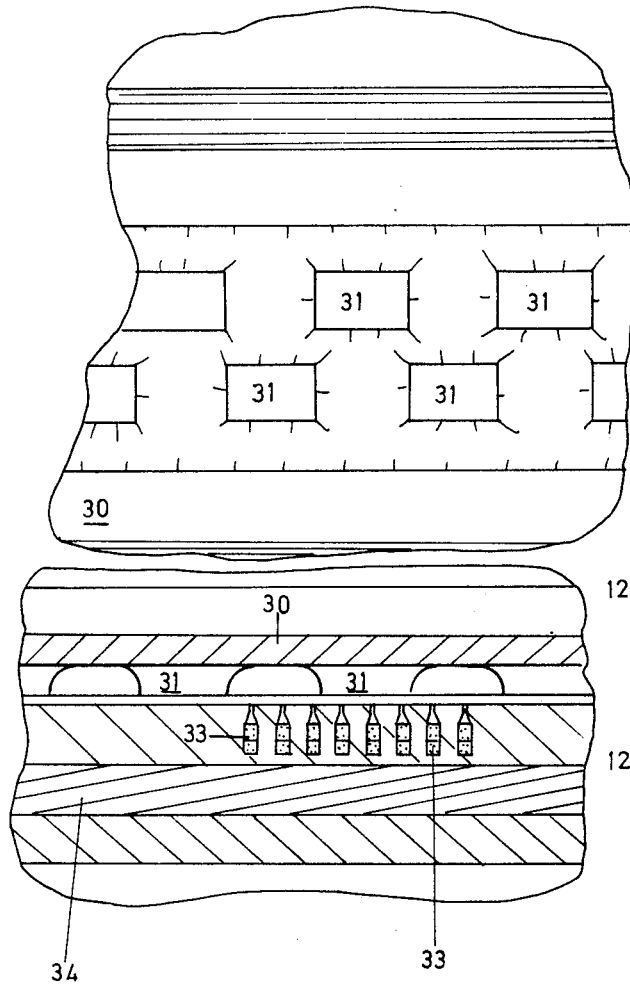
FIG_4
FIG_5
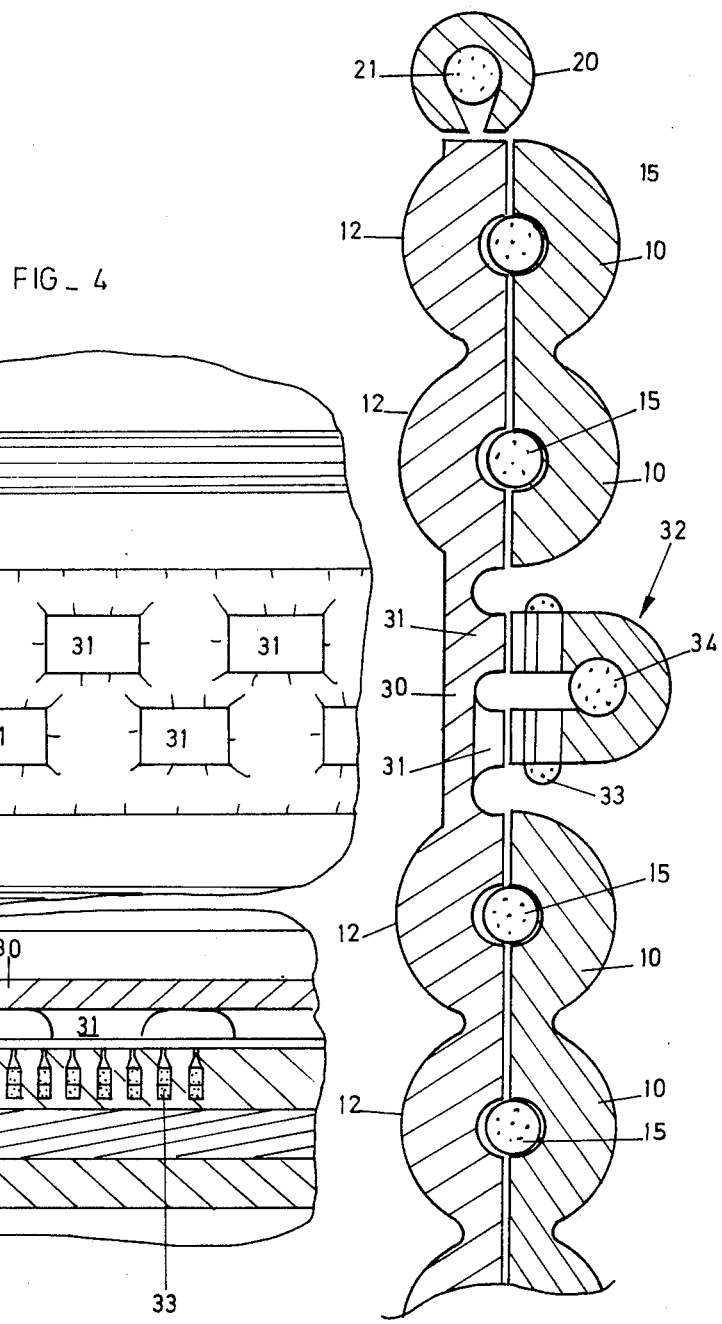
FIG_3

ENERGY STORAGE

BACKGROUND TO THE INVENTION

This invention relates to energy storage.

It has already been proposed to store energy by causing a large diameter fly-wheel to spin about a central axis and applying the energy to be stored to the spinning of the wheel. Energy is withdrawn from the spinning wheel as and when it is required.

It can be shown that the specific energy per unit of mass of a flywheel system may be increased by increasing the radius of the orbit of the outer part of the wheel. However, in a conventional system any mass on that orbit has to be connected to the hub by restraining means such as spokes or webs, which are in themselves massive. The latter mass may offset any gain in specific energy obtained by increasing the radius.

SUMMARY OF THE INVENTION

According to the invention energy is stored by spinning a hoop about a central axis and restraining the hoop to a fixed orbit about that axis by means of electromagnetic forces.

In the preferred form of the invention the hoop is restrained by magnetic forces. In other words the hoop is levitated against gravity and constrained to move in a circular orbit by magnetic forces.

In one form of the invention the hoop is made of a ferromagnetic material and is a rotary fit around a ring-shaped stator made of the same material, while magnetic lines of force are induced in the hoop and stator by current fed into conductors situated at the interface between them. In other words a magnetic bearing is created between the hoop and the stator. Centralization or levitation of the hoop is likewise effected by means of magnetic attraction or repulsion.

Energy may be imparted to or extracted from the hoop by some form of linear electric machinery by forming the hoop with reluctance teeth and utilizing linear reluctance motors or generators, as the case may be.

DESCRIPTION OF THE DRAWINGS

FIG. 1 is a diagrammatic plan view of an energy storing device according to the invention, FIG. 2 is a section, on an enlarged scale, on the line 2—2 in FIG. 1, FIG. 3 is a section through an assembly, FIG. 4 is a face view of a fragment on FIG. 3, and FIG. 5 is a section along the line 5—5 in FIG. 3.

DESCRIPTION OF AN EMBODIMENT

FIG. 1 shows in an exaggerated fashion a stator 10 anchored to the earth by means of anchors 11 around which there fits a hoop 12. The stator 10 and the hoop 12 are of semi-cylindrical section and are thus semi-toroidal in shape. Between them there are annular gaps 14 and a toroidal cavity housing electrical conductors 15. In a practical situation the diameter of the toroid would be of the order of 300 m or larger while the cross-sectional radius of the torus would be of the order of 75 mm.

The stator 10 and the hoop 12 are both made of mild steel.

It will be seen that if a DC current is fed to the conductors 15 a magnetic bearing will be formed between the stator 10 and the hoop 12. The conductors will be in sections with an independent current supply. Sensors (not shown) control the current in each section to keep the gap 14 constant around the torus.

A selected points around the periphery of the torus there are firstly levitation devices 20 also energized by conductors 21 to levitate the hoop 12. Secondly there are linear reluctance motors 22 co-operating with reluctance teeth on the hoop 12 to impart energy to the hoop 12. Thirdly there are reluctance generators 23 to extract energy from the hoop 12. In a suitable case a motor 22 could act as a generator as and when required or a generator could become a motor.

It can be shown that the specific energy of the system is $0.75 \cdot 10^3 R$ joules per kilogram of the mass of the rotor where R is the radius of the torus in meters and the hoop and stator are of mild steel.

Where a large amount of energy is to be stored several toruses (FIG. 3) may be mounted parallel above one another around a single core, e.g. in a subteranian passage or tunnel. The hoops in such an assembly may be mechanically linked so that only one of the hoops needs to be magnetically levitated and so that the hoops rotate at a synchronous speed.

One way of doing this is shown in FIGS. 3 to 5. In this case the stator comprises two superimposed internally fluted rings which provide the sections 10. The hoop is externally fluted to provide sections 12.

Between two sections 12 there is a band 30 which carries reluctance teeth 31. Next to the band 30 is a linear inductance machine 32 formed with armature windings 33 and field windings 34.

I claim:

1. A method of storing energy by causing a large diameter mass to spin about a central axis, applying the energy to be stored to the spinning of the mass and withdrawing energy from the spinning mass as and when required, with the improvement of spinning the mass in the form of a hoop about the central axis, restraining the hoop to a fixed orbit about the central axis by means of electromagnetic forces, positioning a circular stator mounted in fixed relation about the central axis, positioning the hoop and the stator in spaced relation to form an annular gap therebetween, and controlling the current to keep the dimensions of the gap constant.

2. The method claimed in claim 1 which includes levitating the hoop against gravity so that the hoop is constrained to move in a circular orbit.

3. An energy storage system comprising a large diameter mass mounted for rotation about a central axis, means to apply energy to be stored to the mass for it to spin about the axis and means for withdrawing energy from the spinning mass, with the improvement that the mass is a hoop, electromagnetic means for restraining the hoop to a fixed orbit about the central axis, a circular stator mounted in fixed relation about the central axis, the hoop and stator being positioned in spaced relation to form an annular gap therebetween, and conductor means positioned in the gap for the conveying current therethrough to keep the dimensions of the gap constant.

4. The system claimed in claim 3 in which the restraining means applies magnetic forces to the hoop.

5. The system claimed in claim 3 including the stator positioned around the hoop to form a rotary fit, the stator and the hoop being made of a ferromagnetic material, and including the conductor means at the interface between the hoop and the stator along which current may be fed.

6. The system claimed in claim 5 including several interconnected hoops rotating about a common central axis and each hoop is faced by a stator part with the conductor means between them.

7. The system claimed in claim 3 in which the hoop is levitated by an electromagnetic system.

8. The system claimed in claim 3 in which the means to apply energy to the hoop and the means for withdrawing energy from the hoop are linear reluctance machines.